United States Patent [19]

Cornelius et al.

[11] 4,433,540

[45] Feb. 28, 1984

[54] LOW EMISSION COMBUSTOR

[75] Inventors: Walter Cornelius, Troy; Thomas P. Kosek, East Detroit; Edward D. Klomp, Mt. Clemens, all of Mich.

[73] Assignee: General Motors Corporation, Detroit, Mich.

[21] Appl. No.: 385,811

[22] Filed: Jun. 7, 1982

[51] Int. Cl.³ .................... F02C 7/105; F02C 7/228
[52] U.S. Cl. ................... 60/39.511; 60/723; 60/727; 60/731
[58] Field of Search ............ 60/39.511, 723, 727, 60/731, 747, 39.06

[56] References Cited

U.S. PATENT DOCUMENTS

| 3,088,276 | 5/1963 | Hudson | 60/731 |
| 3,308,618 | 3/1967 | Jubb et al. | 60/731 |
| 4,012,904 | 3/1977 | Nogle | 60/39.511 |
| 4,040,252 | 8/1977 | Mosier et al. | 60/723 |
| 4,246,758 | 1/1981 | Caruel et al. | 60/747 |

FOREIGN PATENT DOCUMENTS 55-23317 2/1980 Japan ..................... 60/723

Primary Examiner—Louis J. Casaregola
Assistant Examiner—Timothy S. Thorpe
Attorney, Agent, or Firm—Saul Schwartz

[57] ABSTRACT

A low emission combustor assembly particularly suited for an automotive gas turbine engine has an inlet plenum supplied with regenerated compressor discharge, an exhaust plenum, a diffusion flame combustion chamber disposed between the inlet and exhaust plenums, and a catalytic combustion chamber also disposed between the inlet and exhaust plenums so that parallel flow paths are established between the inlet and exhaust plenums. During engine start-up, fuel is supplied only to the diffusion flame combustion chamber and regenerated compressor discharge simultaneously flowing through the catalytic combustion chamber heats the catalyst to operating temperature and cools and dilutes exhaust from the diffusion flame combustion chamber. When the catalyst reaches operating temperature fuel is directed only to the catalytic combustion chamber wherein an ultra lean air/fuel ratio mixture is catalytically oxidized, the exhaust from this reaction being cooled and diluted by regenerated compressor discharge simultaneously flowing through the diffusion flame combustion chamber.

5 Claims, 7 Drawing Figures

U.S. Patent  Feb. 28, 1984  Sheet 1 of 2  4,433,540
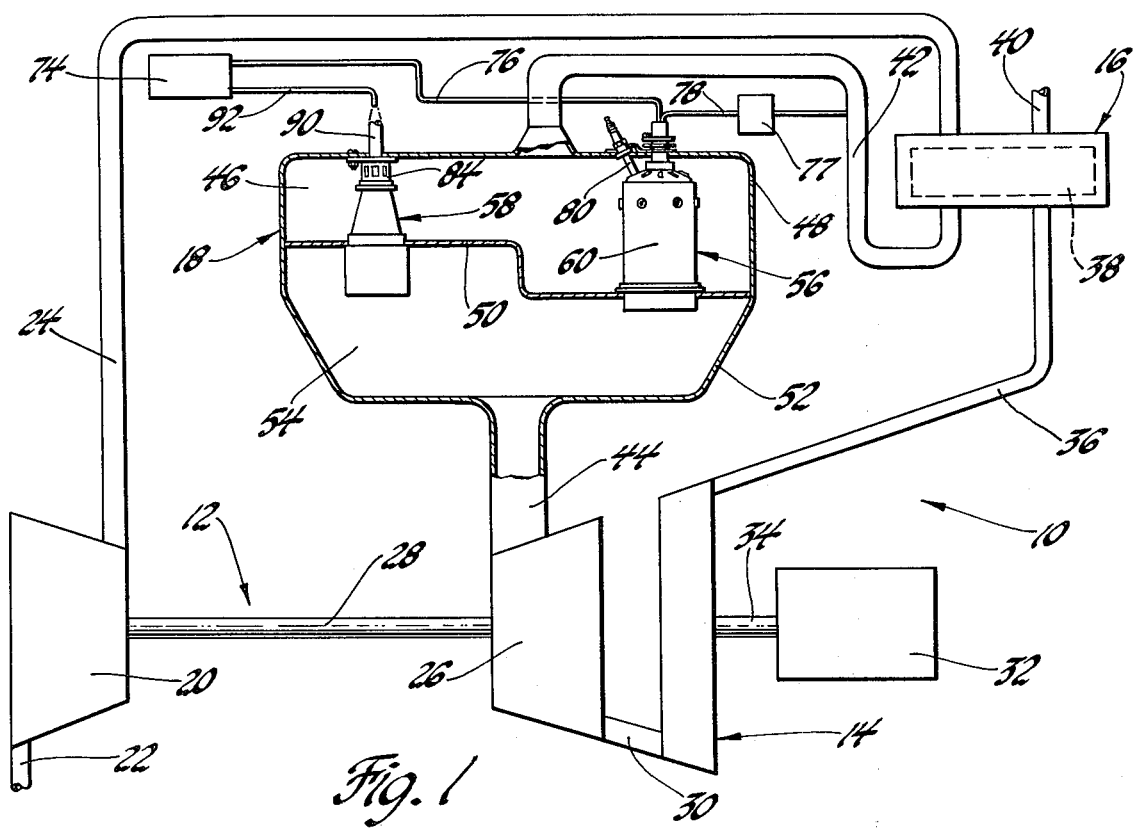
Fig. 1
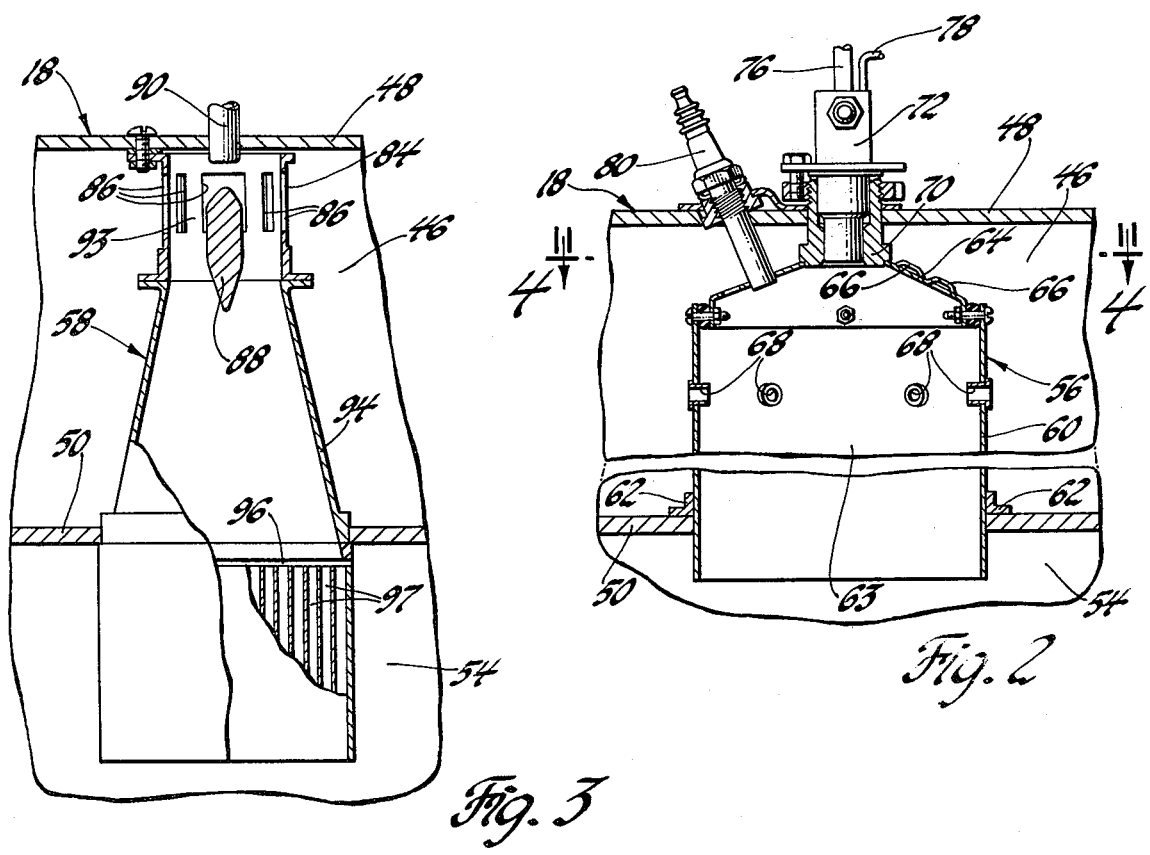
Fig. 3
Fig. 2

LOW EMISSION COMBUSTOR

BACKGROUND OF THE INVENTION

1. Field of the Invention

This invention relates generally to gas turbine engines and, more particularly, to a low emission combustor assembly for an automotive gas turbine engine.

2. Description of the Prior Art

Successful commercial adaptation of a power source to automotive vehicles depends, at least in part, on the degree of success achieved in maintaining exhaust emissions of the power source within prescribed limits. Exhaust components of current primary concern are hydrocarbons (HC), carbon monoxide (CO), and oxides of nitrogen (NOx) and it is known that high temperature, stoichiometric combustion is conducive to minimization of HC and CO but not to minimization of NOx while lean combustion with resulting low flame temperature is conducive to minimization of NOx but not to minimization of HC and CO. In one compromise effort relating to turbojet engines, a combustor assembly includes a pair of more or less conventional diffusion flame combustion chambers disposed in parallel, one chamber for optimum emission at engine idle and the other chamber for optimum emission at acceleration and cruise. However, because combustion chamber length requirements may conflict with vehicle space availability, this proposal lacks attractiveness for automotive applications. In another compromise effort, a combustor assembly includes a catalytic combustion chamber in series with a diffusion flame combustion chamber, the latter operating during engine start-up to directly heat the catalyst while rendering the engine self-sustaining and the former taking over for normal engine operation at low emission levels. The series arrangement, however, increases the possibility of catalyst contamination which, in automotive applications, is undesirable from a durability standpoint. A low emission combustor assembly according to this invention represents an improvement over these and other similar compromise proposals.

DESCRIPTION OF THE INVENTION

The primary feature, then, of this invention is that it provides a new and improved gas turbine engine low emission combustor assembly particularly suited for automotive vehicle application. Another feature of this invention resides in the provision in the new and improved combustor assembly of parallel path catalytic and diffusion flame combustion chambers operative, respectively, during normal engine operation and at engine startup. Still another feature of this invention resides in the provision in the new and improved combustor assembly of a common exhaust plenum wherein products of combustion generated in either one of the combustion chambers are diluted only by compressed air flowing simultaneously through the other of the combustion chambers. A still further feature of of this invention resides in the provision in the new and improved combustor assembly of means for circulating the combined exhaust of the parallel path combustion chambers through a regenerating so that during engine start-up, when combustion takes place in the diffusion flame combustion chamber, only uncontaminated regenerated compressed air flows through the catalytic combustion chamber to raise the temperature of the catalyst therein to an operating level whereupon combustion is shifted to the catalytic combustion chamber and the products of combustion therefrom are diluted by regenerated compressed air passing through the diffusion flame combustion chamber. These and other features of this invention will be readily apparent from the following specification and from the drawings wherein:

FIG. 1 is a simplified schematic illustration of a gas turbine engine having a combustor assembly according to this invention;

FIG. 2 is an enlarged view of a portion of FIG. 1 showing the diffusion flame combustion chamber;

FIG. 3 is similar to FIG. 2 but showing the catalytic combustion chamber;

Figure 4:
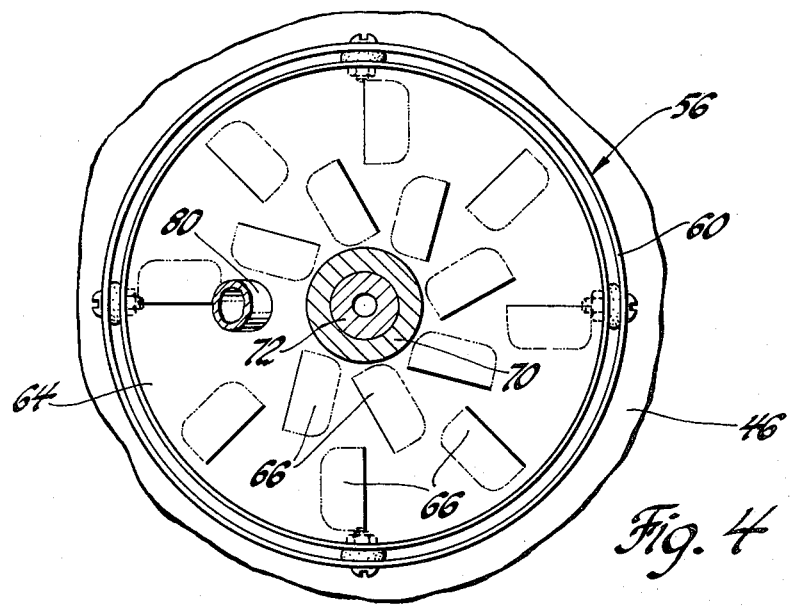
FIG. 4 is a view taken generally along the plane indicated by lines 4—4 in FIG. 2.

Referring now to FIG. 1 of the drawings, a gas turbine engine designated generally 10 includes a gasifier 12, a power turbine 14, a regenerator 16 and a combustor assembly 18 according to this invention. The gasifier 12 includes a compressor 20 having an air intake 22 and a compressed air discharge duct 24 connected to the regenerator 16. The compressor 20 is driven by a gasifier turbine 26 through a shaft 28 with exhaust from the gasifier turbine 26 being directed by a duct 30 to the power turbine 14 for driving the latter. The power turbine drives an external load 32, such as an automobile transmission, through a shaft 34. Exhaust from the power turbine 14 is directed by a duct 36 to the regenerator 16 wherein it passes through a regenerator disc 38 before exhausting to atmosphere through an exhaust 40. The regenerator disc 38 is heated in conventional fashion by the exhaust of power turbine 14 and rotates from alignment with the duct 36 into alignment with a stream of relatively cool compressed air delivered to the regenerator by the compressor discharge duct 24. The relatively cool compressed air passes through the regenerator disc wherein it is heated to a temperature proportional to the exhaust temperature of power turbine 14. From the regenerator 16, the heated or regenerated compressed air is directed to the combustor assembly 18 by a duct 42. Products of combustion generated in the combustor assembly 18, as described more fully hereinafter, are directed to the gasifier turbine 26 through a duct 44.

With continued reference to FIG. 1, the combustor assembly 18 includes an inlet plenum 46 defined by a first outer wall portion 48 and an internal bulkhead 50 of the combustor assembly. The outer wall portion 48 includes provision for attachment of duct 42 thereto so that regenerated compressed air is directed from the duct 42 into the inlet plenum 46 which is thereby maintained at essentially compressor discharge pressure. A second outer wall portion 52 of the combustor assembly cooperates with the bulkhead 50 in defining an exhaust plenum 54, the second outer wall portion including provision for attachment of duct 44 thereto so that products of combustion delivered to the exhaust plenum 54, as described more fully hereinafter, are conveyed from the plenum to the gasifier turbine 26 through the duct 44.

As seen best in FIGS. 1, 2, 3 and 4, the combustor assembly 18 further includes a diffusion flame combustion chamber 56 and a catalytic combustion chamber 58. The diffusion flame combustion chamber 56 includes a cylindrical liner 60 projecting through the bulkhead 50 and being attached to the latter by schematically illustrated brackets 62. The liner 60 defines a reaction zone 63 which is open to the exhaust plenum 54 below the bulkhead 50 and is closed at the opposite end by a dome 64 having a plurality of angularly spaced louvers 66 therein, FIGS. 2 and 4. The louvers 66 provide communication between the inlet plenum 46 and the reaction zone 63 and direct air passing from the former into the latter in a generally downward swirling pattern. A plurality of primary air ports 68 in the liner 60 provide further communication between the inlet plenum 46 and the reaction zone 63.

Referring particularly to FIGS. 1, 2 and 4, a bushing or insulator 70 is centrally attached to the dome 64 and to the outer wall 48 and supports therein a conventional airblast or atomizing type fuel nozzle 72. Fuel nozzle 72 is connected to a schematically illustrating conventional main fuel control 74 by a schematically illustrated fuel line 76 and to a source 77 of supercharged air by a similarly schematically illustrated air conduit 78. In known fashion, then, fuel nozzle 72 is operative to direct a finely atomized spray of combustible fuel into the reaction zone 63 wherein a combustible mixture results from intimate mixture of the fuel with swirling compressed air directed into the reaction zone by the louvers 66 and the primary air ports 68. The combustible mixture is ignited by a conventional igniter 80 disposed on the outer wall 48 and projecting through the dome 64 into the reaction zone 63.

Referring, now, to FIGS. 1 and 3, the catalytic combustion chamber 58 includes a cylindrical prechamber housing 84 attached to the interior of outer wall 48 and having a plurality of elongated slots 86 therethrough and a streamlined center body 88 supported centrally therein. A fuel nozzle 90 projects through outer wall 48 and generally overlies center body 88, the fuel nozzle being connected to the main fuel control 74 by a schematically illustrated fuel line 92. The interior of the prechamber housing 84 defines a generally conventional premixing-prevaporizing prechamber 93 wherein fuel sprayed at relatively low pressure from nozzle 90 and not otherwise vaporized during spraying forms a film on the interior wall of the housing 84 which vaporizes in swirling compressed air admitted to the prechamber 93 through elongated slots 86. The slots 86 provide communication between the inlet plenum 46 and the prechamber 93 and cooperate with the center body 88 in directing a swirling flow of air over the fuel film which vaporizes therein. The air/fuel mixture thus developed flows in a downward swirl into a generally cone-shaped transition diffuser 94 attached at one end to the prechamber housing 84 and at the other end to the internal bulkhead 50. The diffuser 94 directs the swirling air/fuel mixture into a cylindrical catalytic reaction zone 96 preferably having a monolith therein defining a plurality of longitudinally extending honeycomb-like passages 97 between the diffuser and the exhaust plenum 54.

The surfaces of the passages 97 are coated with a conventional high temperature resistant oxidation catalyst having an elevated operating temperature range generally above 500° F. whereat the catalyst promotes combustion of ultra-lean air/fuel mixtures having air/fuel ratios below the lean flammability limit of ordinary diffusion flame or premixing-prevaporizing type combustors. The transition diffuser 94 is designed to insure equal flow of lean air/fuel mixture into all of the passages 97 while precluding recirculation of the mixture to prevent auto ignition in the diffuser or the prechamber 93 where homogeneity has not yet been achieved. The products of combustion developed in the reaction zone 96 exhaust into the exhaust plenum 54 through the open lower end of the reaction zone 96 below the bulkhead 50.

In the combustor assembly 18, parallel flow paths are defined between the inlet plenum 46 and the exhaust plenum 54. More particularly, a first flow path through diffusion flame combustion chamber 56 has air flowing into reaction zone 63 through louvers 66 and primary air ports 68, the air flow having a downward swirl toward the open lower end of the liner 60. In the absence of fuel flow to the nozzle 72, air flows through and out of the liner 60 into exhaust plenum 54 wherein it is funneled toward the mouth of duct 44. A second parallel flow path through catalytic combustion chamber 58 has air flowing into prechamber 93 through elongated slots 86 and then swirling down around center body 88 into transition diffuser 94. From the diffuser 94 the air flows down through the honeycomb passages 97 in reaction zone 96 and into exhaust plenum 54 where it is also funneled toward the mouth of duct 44. As an important feature of the combustor assembly 18, simultaneously funneling exhaust from diffusion flame combustion chamber 56 and catalytic combustion chamber 58 toward the same area at the mouth of duct 44 produces in that duct a thoroughly mixed combination of both exhausts which combination is then directed through conventional nozzles at the gasifier turbine 26 to drive the latter. When the inlet plenum 46 is pressurized so that air flows simultaneously in both parallel paths described, a pressure drop exists across each of the combustion chambers 56 and 58. In operation, it is desirable to size the louvers 66, the primary air ports 68, and the elongated slots 86 such that the overall pressure drop across the two combustion chambers equals approximately 2% of the absolute pressure in the inlet plenum.

From an engine off condition a typical engine operating sequence is commenced by engagement of a mechanical starter, not shown, which rotates the shaft 28 and the compressor 20 to develop a flow of compressed air through duct 24, the cold regenerator disc 38, and duct 42 into inlet plenum 46. As soon as absolute pressure in inlet plenum 46 exceeds atmospheric, air begins flowing in the parallel paths described through both combustion chambers 56 and 58. After a short interval sufficient for a predetermined minimum pressure to develop in the inlet plenum 46, fuel control 74, functioning in a first mode, initiates fuel flow to the airblast nozzle 72 from which a finely atomized spray of fuel issues into the reaction zone 63. Simultaneously a stream of high energy plasma is injected by igniter 80 into the reaction zone 63 thereby igniting the air/fuel mixture therein. The products of combustion from reaction zone 63 exhaust into exhaust plenum 54 and are funneled toward the mouth of duct 44. The primary air ports 68 and the louvers 66 are sized relative to the elongated slots 86 in the prechamber housing 84 such that between 20% and 30% of total air flow to the inlet plenum 46 passes through diffusion flame combustion chamber 56, the remainder flowing through catalytic reaction chamber 58. This amount of air flow is sufficient to effect substantially stoichiometric combustion in reaction zone 63 with maximum flame temperature so that HC and CO in the exhaust therefrom are minimized.

Simultaneously, with no fuel flowing to the nozzle 90, relatively cool compressed air flows substantially unhindered through the catalytic combustion chamber 58 and into the exhaust plenum 54 where it is funneled toward the mouth of duct 44. At the mouth of duct 44 the relatively cool air flowing in the second flow path through catalytic combustion chamber 58 mixes with, dilutes, and cools the exhaust from diffusion flame combustion chamber 56 to a temperature compatible with nozzle and turbine blade durability at the gasifier turbine 26. The cooled products of combustion are directed into the gasifier turbine so that the latter commences driving compressor 20 through shaft 28 at a speed which rapidly overruns the capability of the mechanical starter.

Continuing the starting sequence, hot exhaust from the gasifier turbine 26 is directed to substantially unloaded power turbine 14 through duct 30 and then through duct 36 to regenerator 16 where it passes through the heats regenerator disc 38 before exhausting through exhaust 40. The temperature of the regenerator disc 38 increases rapidly toward the temperature of exhaust from power turbine 14 so that the temperature of the compressed air passing from duct 24, through the regenerator disc and through duct 42 to the inlet plenum 46 likewise increases. With heated compressed air being introduced into inlet plenum 46, the air flowing through catalytic combustion chamber 58 is correspondingly hotter and functions to heat the catalyst coating the walls of passages 97 in the catalytic reaction zone 96 as the air passes therethrough during flow toward exhaust plenum 54. Within a relatively short period of time after the onset of the starting sequence, the engine becomes self sustaining with exhaust from power turbine 14 achieving a temperature sufficiently high to raise the temperature of the compressed air in inlet plenum 46 to a level corresponding to the operating temperature of the catalyst on the walls of passages 97.

Temperature sensors, not shown, in the walls of passages 97 monitor the temperature of the catalyst and, when the operating temperature of the latter is achieved, initiate operation of the fuel control 74 in a second mode wherein fuel flow to diffusion flame combustion chamber 56 is terminated and fuel flow to nozzle 90 in catalytic combustion chamber 58 is initiated. The fuel control 74 schedules fuel to the nozzle 90 in accordance with engine power demand in conventional fashion but at rates which result in production of an ultra lean air/fuel mixture in the prechamber 93 and transition diffuser 94 below the lean combustion flammability limit for diffusion flame or premixing-prevaporizing type combustion devices. In the presence of the catalyst, however, the ultra lean air/fuel mixture oxidizes in the passages 97 at a relatively low temperature which minimizes NOx formation. CO and HC are also minimized during the catalytic reaction so that the overall emission level from the catalytic combustion chamber 58 is acceptable. It is also essential that the reaction temperature in the passages 97 be compatible with satisfactory catalyst life. By maintaining air flow through catalytic reaction zone 96 of about 70% to 80% of air flow to inlet plenum 46, acceptable catalyst life can be expected.

As combustion in the catalytic combustion chamber 58 progresses, regenerated compressed air in inlet plenum 46 flows substantially unhindered through diffusion flame combustion chamber 56 into exhaust plenum 54. This flow is funneled toward duct 44 and mixes with, dilutes, and cools the exhaust from chamber 58. The mixture then flows through duct 44 to the gasifier turbine 26 at a temperature compatible with nozzle and blade durability. As the power demand on the engine varies between idle and higher levels corresponding to vehicle operation, fuel flow to the catalytic combustion chamber 58 varies accordingly and produces sufficient combustion products to provide the required power.

With respect to overall exhaust emission performance, the engine starting sequence is sufficiently rapid to ensure that the duration of combustion in the diffusion flame combustion chamber 56 is compatible with total vehicle emission goals covering a total operating cycle including start-up, acceleration, idle, and cruise. In addition, by virtue of the fact that only regenerated compressed air is required to heat the catalyst, the likelihood of contaminating the catalyst is significantly reduced.

Figure 5:
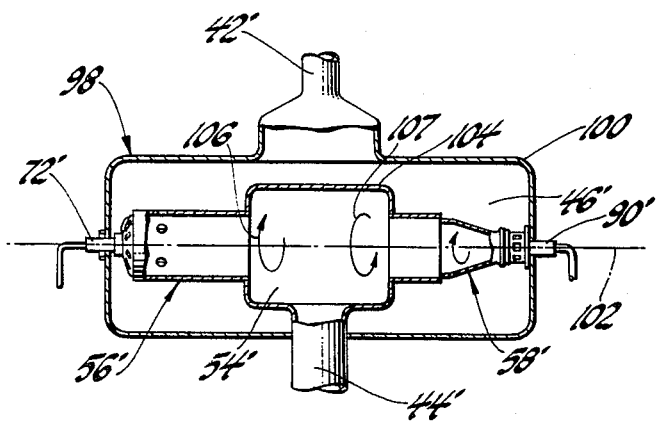
FIG. 5 is a schematic illustration of a first modified combustor assembly according to this invention.
Figure 6:
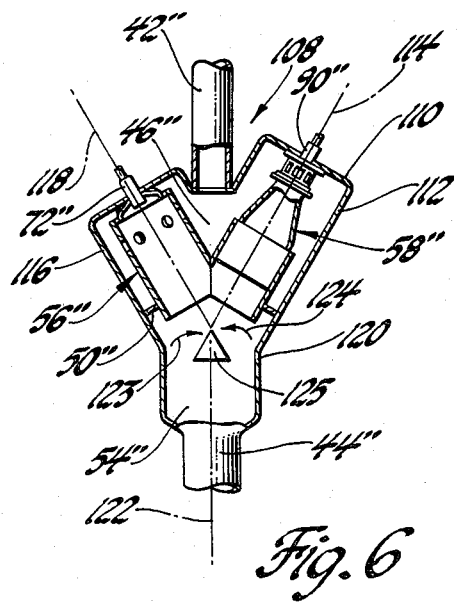
FIG. 6 is a schematic illustration of a second modified combustor assembly according to this invention.
Figure 7:
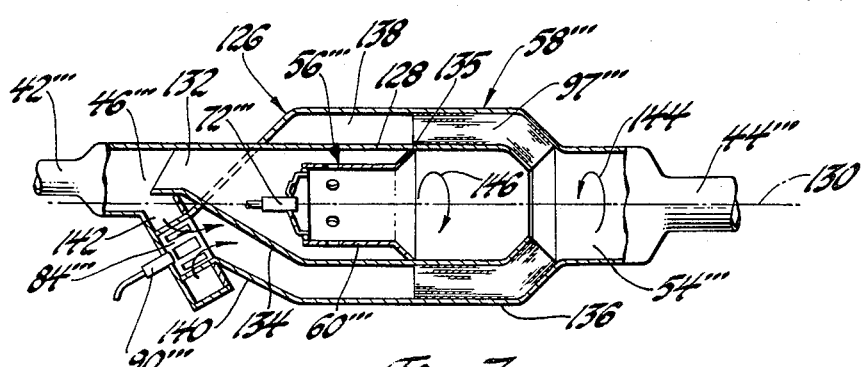
FIG. 7 is a schematic illustration of a third modified combustor assembly according to this invention.

Referring now to FIGS. 5, 6 and 7 wherein components identified with primed reference characters correspond to similarly identified components in FIGS. 1 through 4, a first modified combustor assembly 98 according to this invention is schematically illustrated in FIG. 5 between a duct 42' from the regenerator and a duct 44' to the gasifier turbine. The modified assembly 98 includes a generally rectangular housing 100 the interior of which defines an inlet plenum 46' connected to duct 42'. A diffusion flame combustion chamber 56' is rigidly attached to one end of the housing 100 and is disposed along an axis 102 of the latter. A catalytic combustion chamber 58' is rigidly attached to the opposite end of the housing 100 and disposed along the axis 102. Both chambers 56' and 58' discharge from opposite sides into a housing 104 defining an exhaust plenum 54'. The exhaust plenum 54' connects through the housing 100 to the duct 44'. In the modified combustor assembly 98, parallel flow paths are established between the inlet plenum 46' and the exhaust plenum 54' through diffusion flame combustion chamber 56' and catalytic combustion chamber 58' so that operation of the modified combustor assembly corresponds to that of combustor assembly 18. As an additional feature of the modified assembly, however, the swirl of the exhaust from chamber 56' denoted by an arrow 106, FIG. 5, is counter to the swirl of exhaust from chamber 58' denoted by an arrow 107. Accordingly, within the exhaust plenum 54' there is substantial turbulence and intimate mixing of the two exhaust streams.

Referring now to FIG. 6, a second schematically illustrated modified combustor assembly 108 according to this invention includes a Y-shaped housing 110 having a first cylindrical portion 112 disposed along an axis 114 of the housing, a second cylindrical portion 116 disposed along a second axis 118 of the housing and a third cylindrical portion 120 disposed along a third axis 122 of the housing intersecting the other axes 114 and 118. The interior of the housing 110 is connected to a duct 42" from the regenerator and to a duct 44" to the gasifier turbine. A diffusion flame combustion chamber 56" is disposed within the housing 110 along axis 118 so that the products of combustion generated therein exit generally toward the intersection of axes 114, 118 and 122. A catalytic combustion chamber 58'' is disposed within the housing 110 along axis 114 such that the products of combustion generated therein are discharged generally toward the intersection of the axes 114, 118 and 122. A bulkhead 50'' between the interior surface of housing 110 and the chambers 56'' and 58'' divides the interior of the housing into an inlet plenum 46'' and an exhaust plenum 54''. In the modified combustor assembly 108, parallel flow paths are established between the inlet plenum 46'' and the exhaust plenum 54'' through diffusion flame combustion chamber 56'' and catalytic combustion chamber 58'' so that operation of the modified combustor assembly corresponds to that of combustor assembly 18. In addition, while the swirl of the exhaust from chamber 56'' denoted by an arrow 123, FIG. 6, is counter to the swirl of exhaust from chamber 58'' denoted by an arrow 124, more intimate mixing of the two exhaust streams is insured by a cone-shaped ceramic body 125 mounted on the housing 110 generally at the intersection of the axes 114, 118 and 122.

Referring now to FIG. 7, a third schematically illustrated modified combustor assembly 126 according to this invention is disposed between a duct 42''' from the regenerator and a duct 44''' to the gasifier turbine. The combustor 126 has a generally cylindrical tube 128 disposed along an axis 130, the tube having an inlet end 132 of somewhat smaller diameter connected to the main portion of the tube by a transition section 134. A diffusion flame combustion chamber 56''' is disposed in the tube 128 with the open end of a liner portion 60''' of the chamber sealing against the inner surface of the tube at a junction 135 so that no air flows around the chamber 56'''. The combustor 126 further includes an outer cylindrical wall 136 wrapped around the tube 128 and defining an annulus 138 therebetween and merging with duct 44''' beyond the end of tube 128. A monolith having catalyst coated passages 97''' therethrough is disposed in the annulus 138 such that air flowing through the passages merges with exhaust from diffusion flame combustion chamber 56''' at the end of tube 128 in an exhaust plenum 54'''. A transition diffuser 140 of somewhat different configuration than diffuser 94 conveys air from a prechamber housing 84''' to the annulus 138 so that a catalytic combustion chamber 58''' corresponding to chamber 58 in combustor assembly 18 is defined around the diffusion flame combustion chamber. The chamber 58''' is supplied with compressed air from tube 42''' by a branch 142 which, with that portion of tube 128 to the left of diffusion flame combustion chamber 56''' defines an inlet plenum 46'''. In the modified combustor assembly 126, parallel flow paths are established between the inlet plenum 46''' and the exhaust plenum 54''' through diffusion flame combustion chamber 56''' and catalytic combustion chamber 58''' so that operation of the modified combustor assembly corresponds to that of combustor assembly 18. In the modified assembly 126, the swirl of the exhaust from chamber 58''' denoted by an arrow 144, FIG. 7, is counter to the swirl of exhaust from chamber 56''' denoted by an arrow 146. Accordingly, within the exhaust plenum 54''' there is again substantial turbulence and intimate mixing of the two exhaust streams.

The embodiments of the invention in which an exclusive property or privilege is claimed are defined as follows:

1. In a gas turbine engine having a compressor, a turbine, a regenerator, and means for circulating turbine exhaust and compressor discharge through said regenerator whereby said compressor discharge is regeneratively heated to a temperature proportional to turbine exhaust temperature, the combination comprising, an inlet plenum maintained at compressor discharge pressure by said regenerated compressor discharge, a catalytic combustion chamber open to said inlet plenum and having a catalyst therein exposed to flow therethrough, said catalyst being operative at temperatures above a minimum temperature to sustain an ultra lean air/fuel ratio combustion reaction within said catalytic combustion chamber, a diffusion flame combustion chamber open to said inlet plenum, means defining a common exhaust plenum between each of said catalytic combustion and said diffusion flame combustion chambers and said turbine so that parallel flow paths are established whereby products of combustion developed in one of said catalytic combustion and said diffusion flame combustion chambers are diluted and cooled by regenerated compressor discharge flowing through the other, and fuel supply means operative in a first mode during engine start-up to meter fuel only to said diffusion flame combustion chamber and to effect ignition therein until said regenerated compressor discharge achieves a temperature corresponding to a temperature of said catalyst above said minimum temperature and thereafter in a second mode to meter fuel to only said catalytic combustion chamber for catalyst sustained combustion therein.

2. In a gas turbine engine having a compressor, a turbine, a regenerator, and means for circulating turbine exhaust and compressor discharge through said regenerator whereby said compressor discharge is regeneratively heated to a temperature proportional to turbine exhaust temperature, the combination comprising, an inlet plenum maintained at compressor discharge pressure by said regenerated compressor discharge, a catalytic combustion chamber open to said inlet plenum and including a prechamber and a monolith having a plurality of catalyst coated passages therethrough wherein said catalyst is exposed to flow through said catalytic combustion chamber and operative at a temperature above a minimum temperature to sustain an ultra lean air/fuel ratio combustion reaction within said passages, a diffusion flame combustion chamber open to said inlet plenum, means defining a common exhaust plenum between each of said catalytic combustion and said diffusion flame combustion chambers and said turbine so that parallel flow paths are established whereby products of combustion developed in one of said catalytic combustion and said diffusion flame combustion chambers are diluted and cooled by regenerated compressor discharge flowing through the other, and fuel supply means operative in a first mode during engine start-up to meter fuel only in to said diffusion flame combustion chamber and to effect ignition therein until said regenerated compressor discharge achieves a temperature corresponding to a temperature of said catalyst above said minimum temperature and thereafter in a second mode to meter fuel only into said prechamber for mixture with said regenerated compressor discharge and subsequent catalyst sustained combustion in said catalyst coated passages.

3. In a gas turbine engine having a compressor, a turbine, a regenerator, and means for circulating turbine exhaust and compressor discharge through said regenerator whereby said compressor discharge is regeneratively heated to a temperature proportional to turbine exhaust temperature, the combination comprising, an inlet plenum maintained at compressor discharge pressure by said regenerated compressor discharge, a catalytic combustion chamber open to said inlet plenum and including a prechamber and a monolith having a plurality of catalyst coated passages therethrough wherein said catalyst is exposed to flow through said catalytic combustion chamber and operative at a temperature above a minimum temperature to sustain an ultra lean-/air fuel ratio combustion reaction within said passages, a diffusion flame combustion chamber open to said inlet plenum, means for swirling exhaust from said catalytic combustion chamber in a first direction, means for swirling exhaust from said diffustion flame combustion chamber in a second direction generally counter to said first direction, means defining an exhaust plenum between each of said catalytic combustion and said diffusion flame combustion chambers and said turbine wherein said counter swirling exhausts intersect so that products of combustion developed in one of said catalytic combustion and said diffusion flame combustion chambers and swirling in a corresponding one of said first and said second directions is diluted and cooled by regenerated compressor discharge flowing through the other and swirling in the other of said corresponding first and second directions, and fuel supply means operative in a first mode during engine start-up to meter fuel only into said diffusion flame combustion chamber and to effect ignition therein until said regenerated compressor discharge achieves a temperature corresponding to a temperature of said catalyst above said minimum temperature and thereafter in a second mode to meter fuel only into said prechamber for mixture with said regenerated compressor discharge and subsequent catalyst sustained combustion in said catalyst coated passages.

4. The combination recited in claim 3 wherein each of said catalytic combustion and said diffusion flame combustion chambers are disposed on a common axis.

5. The combination recited in claim 3 wherein said catalytic combustion chamber is disposed on a first axis and said diffusion flame combustion chamber is disposed on a second axis and said first and said second axes define an acute angle therebetween.

* * * * *